Dec. 3, 1935.  M. STÖHR  2,023,255
ELECTRIC VALVE OPERATED MOTOR
Filed Feb. 6, 1935
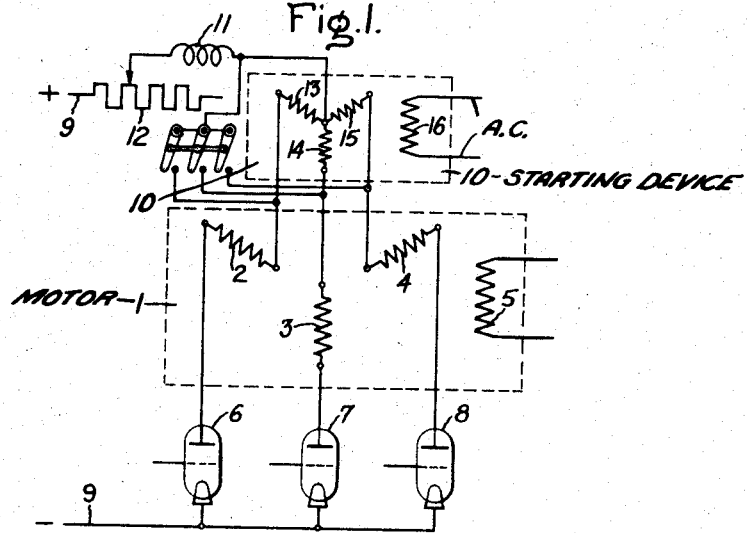
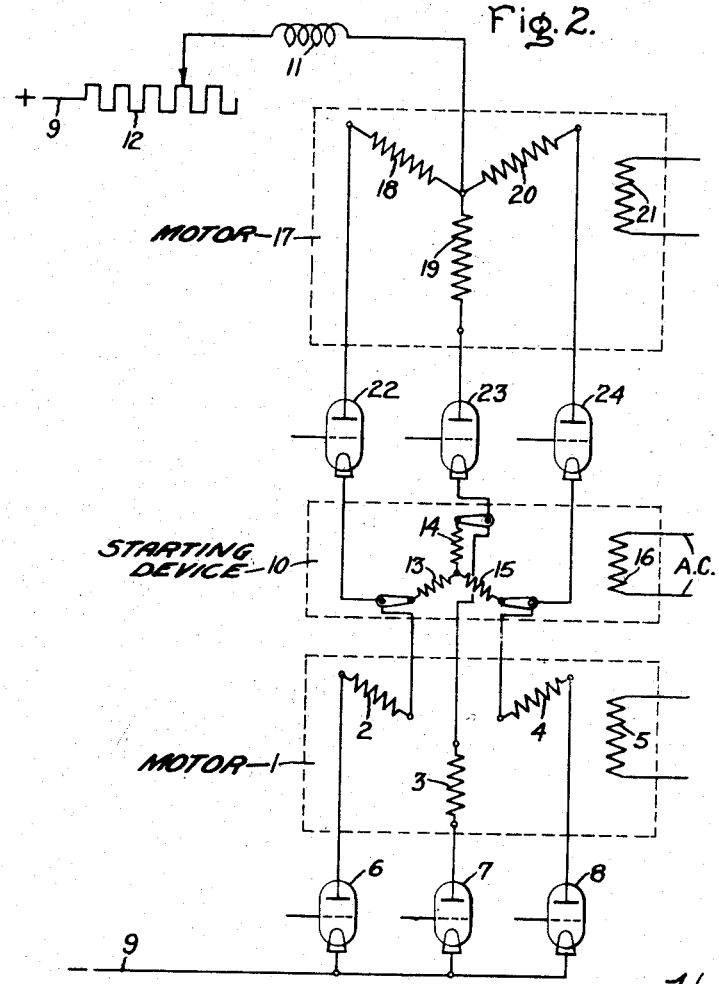
Inventor:
Max Stöhr,
by Harry E. Dunham
His Attorney.

Patented Dec. 3, 1935

2,023,255

UNITED STATES PATENT OFFICE 2,023,255

ELECTRIC VALVE OPERATED MOTOR

Max Stöhr, Berlin-Tegel, Germany, assignor to General Electric Company, a corporation of New York Application February 6, 1935, Serial No. 5,309
In Germany February 14, 1934

4 Claims. (Cl. 171—228)

My invention relates to electric valve operated motors and more particularly to an arrangement for starting motors which are energized by means of electric valves having control electrodes.

It is well known that the operating voltage of direct current motors is limited by the segment voltage and the number of segments of the commutator, but it is possible to overcome this disadvantage by replacing the mechanical commutator by an electric valve system utilizing control discharge devices. It is common to utilize grid controlled vapor or gas discharge devices wherein the arc cannot be readily extinguished by impressing a negative voltage upon the grid and hence some means must be provided to extinguish this arc by some source of commutating potential. This condition obtains particularly at starting and low speeds of the motor, inasmuch as the motor does not develop a counter-electromotive force sufficient to produce commutation between the valves.

It is therefore an object of my invention to provide an improved and simplified arrangement for starting valve controlled electric motors.

Another object of my invention is to provide a starting arrangement requiring only a small apparatus for introducing the commutating voltage into the motor circuit.

It is a further object of my invention to provide an arrangement where a single apparatus will introduce a proper commutating voltage for several motors which are connected in series.

It is still a further object of my invention to provide an arrangement whereby the motor windings may be connected directly to the power supply circuit by means of electric valves without the use of transformers.

According to my invention, an alternating current voltage is introduced into the open star armature windings of a motor to provide commutation between the individual electric valves thereby to produce in the armature a rotating field. The introduction of the alternating current voltage is accomplished by connecting a transformer or motor between the open star connections of the armature windings of the main motor and one side of a power supply circuit.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawing, in which Fig. 1 is a diagrammatic representation of my invention utilizing a single motor, and Fig. 2 is a representation showing an application of my invention to an arrangement where two or more motors are connected in series.

Referring to Fig. 1 of the drawing, I have illustrated therein an electric motor 1 provided with a plurality of windings 2, 3, and 4 arranged in open star relation and having an exciting winding or field coil 5 which may be energized from any suitable source. The outer terminals of the open star winding of the motor are connected to the anodes of the valves 6, 7, and 8 which have their cathodes connected to the negative side of the power supply circuit 9. The other terminals of the open star windings 2, 3, and 4 are connected through a starting device such as a transformer or motor 10 to the other side of the power supply circuit by means of a smoothing choke 11 and an adjustable resistor 12. A convenient form of the starting device 10 may comprise as shown, a star connected armature 13, 14, and 15 by means of which the commutating alternating current voltage is introduced into the motor 1. Energy is supplied to the star connected winding of the starting device 10 from a suitable alternating current source connected to the field winding 16. The frequency of the alternating current supplied to the coil 16 must be such that it is greater than the instantaneous frequency of the counter E. M. F. produced in the motor during the starting period up to the speed at which the motor will pick up speed of its own accord and at which time the starting device 10 may be short circuited or disconnected. The amplitude of the alternating current voltage induced into the windings 13, 14, and 15 must exceed that of the direct current voltage supplied by the power source 9 so that commutation will occur between the valves 6, 7, and 8 to produce a rotating electro-magnetic field which will cause the rotor of the motor 1 to move. As soon as the motor 1 has attained a speed at which the counter-electromotive forces produced in the windings are sufficient to produce commutation between the valves 6, 7, and 8, the field coil 16 of the starting device 10 is deenergized. The windings 13, 14, and 15 may then be disconnected or short circuited.

For the purpose of simplicity and clarity of explanation the circuits for energizing the control electrodes or grids of the valves 6, 7, and 8 have been omitted, inasmuch as it will be obvious to those skilled in the art that any of the well known control circuits are applicable to the arrangement shown. Furthermore, it will be obvious to those skilled in the art that the open star windings 2, 3, and 4 may comprise a stator armature, the motor having a field excitation rotor winding 5. Obviously, of course, slip rings are provided where necessary for connection to the operating windings of the motor 1.

Referring to Fig. 2 I have shown therein a starting arrangement suitable for a plurality of motors connected in series wherein like parts in Fig. 2 are given the same reference numerals as in Fig. 1. In this arrangement a second motor 17 having the star connected windings 18, 19 and 20 and an excitation winding 21 is connected in series between the positive side of the direct current circuit 9 and the motor 1 and starting device 10 by means of a plurality of valves 22, 23, and 24. The windings 18, 19, and 20 which are arranged in star formation have their neutrals connected to the direct current line 9 and the outer terminals of the windings are connected to the anodes of the valves 22, 23, and 24. The cathodes of the valves 22, 23, and 24 are connected, respectively, to the outer terminals of the star windings 13, 14 and 15 of the starting motor or device 10. Obviously, of course, the excitation windings 5 and 21 of the motors 1 and 17 may be connected in parallel so as to be energized from the direct current source 9 or any other suitable source. It will furthermore be obvious to those skilled in the art that the control electrode excitation circuits of the valves 6, 7, 8, 22, 23, 24 may be obtained from a common system. It is to be noted, however, that in this arrangement the starting device 10 has the advantage that the windings 13, 14, and 15 do not transmit any of the load current of the motors but it only supplies the commutating voltage. This arrangement has a further advantage that the necessary commutating voltage is developed in these motors at a lower speed than in the single motor arrangement and hence an economic advantage may be obtained by the reduction of the size of the starting device 10.

While I have shown and described my invention in connection with certain specific embodiments, it will, of course, be understood that I do not wish to be limited thereto, since it is apparent that the principles herein disclosed are susceptible of numerous other applications, and modifications may be made in the circuit arrangement and in the instrumentalities employed without departing from the spirit and scope of my invention as set forth in the appended claims.

What I claim as new and desire to secure by Letters Patent of the United States is:

1. In combination, a direct current source, a motor having one of its windings arranged in open star relation, a plurality of valves connected directly between one side of said direct current source and the outer ends of said motor windings, and means connected between the inner ends of said motor windings and the other side of said direct current source for introducing a periodic voltage into said system for commutating the current between said valves.

2. In combination, a direct current source, a motor having one of its windings arranged in open star relation, a plurality of valves connected directly between one side of said direct current source and the outer ends of said open star windings, a second motor having one of its windings arranged in closed star relation, a connection between the other side of said direct current source and the neutral point of said closed star windings, a plurality of valves connected to the outer terminals of said second motor winding, and means connected between said latter valves and the inner ends of said open star windings for introducing a periodic voltage into said system for commutating the current between said valves during the starting period.

3. A system for commutating current, comprising a source of direct current, a motor having an armature divided into a plurality of windings arranged in open star relation, a plurality of electric valves connected directly between the outer extremities of said windings and one side of said current source, a starting device having a plurality of windings equal in number to said motor armature winding and arranged in closed star relation, connections from the extremities of said windings to the inner extremities of said motor windings, a connection from the other side of said direct current source to the neutral of said starting device, and an excitation winding for said starting device arranged to be energized from an alternating current source.

4. In combination, a direct current source, a motor having one of its windings arranged in open star relation, a plurality of valves connected directly between one side of said direct current source and the outer extremities of said motor windings, a second motor having one of its windings arranged in closed star relation with the neutral thereof directly connected to the other side of said direct current circuit, a plurality of valves connected directly between the outer extremities of the windings of said second motor and the inner extremities of the windings of said first motor, and starting means comprising a star connected network interconnecting the inner extremities of the open star winding of said first motor, and means for energizing said starting network from a source of periodic current thereby to introduce into said system a periodic voltage for commutating the current between said valves.

MAX STÖHR.